Oct. 26, 1926.

J. R. GAMMETER 1,604,272

METHOD AND APPARATUS FOR MAKING SPONGE RUBBER ARTICLES

Filed August 12, 1922

Inventor
John R. Gammeter.
By Robert M Pierson
Atty.

Patented Oct. 26, 1926.

1,604,272

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING SPONGE-RUBBER ARTICLES.

Application filed August 12, 1922. Serial No. 581,315.

This invention relates principally to the manufacture of sponge-rubber articles or those having a sponge-rubber element, and one of its objects is to provide an improved method and apparatus for molding and vulcanizing the article or element in a mold exposed to open steam in such manner as to avoid access of the steam to the molding cavity. As an illustration of the invention, I have shown it applied to the production of hand-wheels, such as steering wheels for automobiles and air craft, provided with a moldable rim, and in this aspect of the invention my object is to provide a simple and effective method and apparatus for molding a heat-expansible body of rim-forming material, such as sponge-rubber stock, upon a metal spider.

Figure 1:
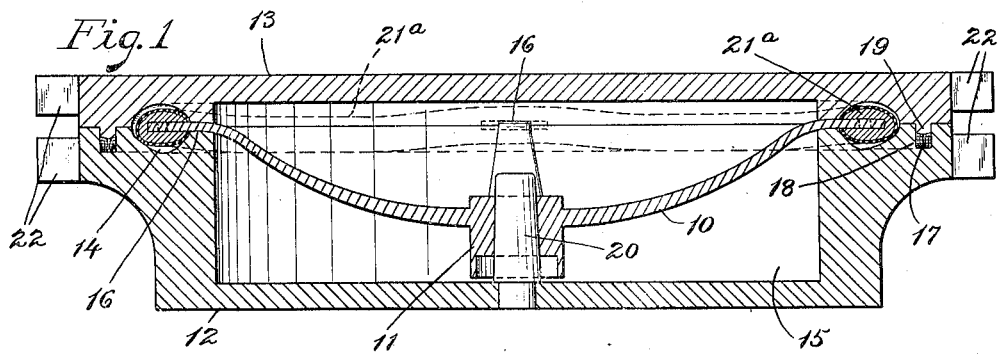

Of the accompanying drawings, Fig. 1 is a vertical section of a mold constructed according to and adapted to carry out my invention, with the work shown in place, the rim-forming material being in its unexpanded condition.

Figure 2:
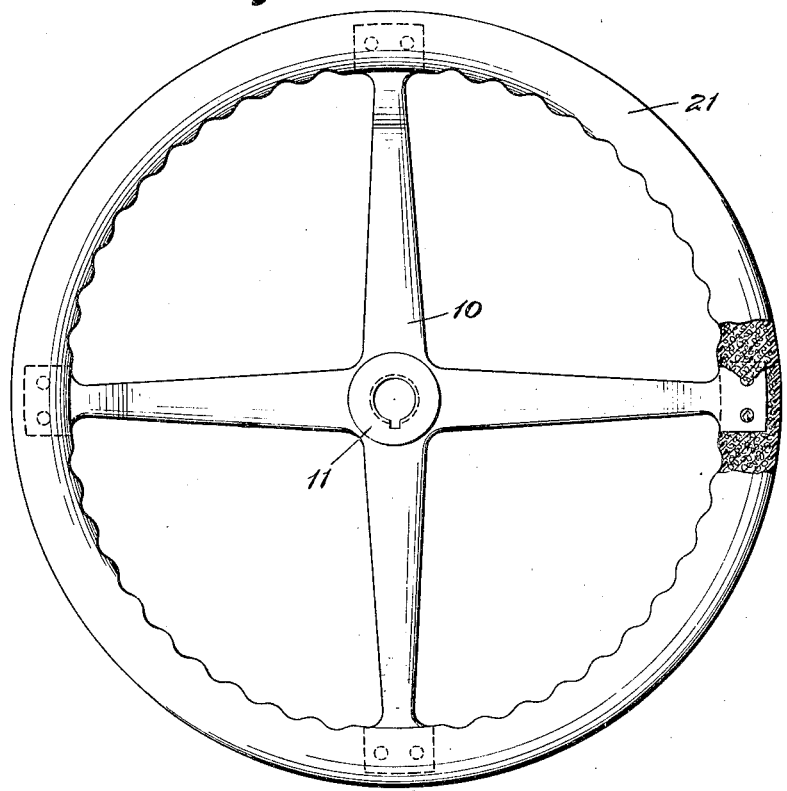

Fig. 2 is a plan view of the finished steering wheel, partly in section.

In the drawings, 10 is a metal wheel-spider having a centrally-apertured hub 11. 12 is the lower member and 13 the upper member of a two-part mold having an annular rim-molding cavity 14, a large, central, circular chamber 15, and radial channels 16 connecting said cavity and chamber and cut in the respective mold members for receiving the spokes of the wheel-spider, the ends of which extend into the molding cavity 14.

Between said molding cavity and the outer edge of the mold, I provide an annular gasket or packing-ring 17 contained in a groove 18 in the lower mold member and held under compression by an annular rib 19 on the upper mold member, which enters said groove when the mold is closed.

20 is a tapered pin projecting upwardly from the bottom of the chamber 15 for centralizing the wheel-spider 10, this pin being made to fit the aperture in the hub of said spider.

22, 22 are bolting or clamping lugs.

21 is the finished rim of the steering wheel and 21ª is the annular body of rim-forming stock before being expanded. This body may, for example, consist of a core of hard-rubber stock containing a gasifying substance which produces cellular or sponge hard rubber when vulcanized, and an outer skin or veneer of dense rubber stock whose sulphur content may be such as to form a covering of either hard or soft rubber upon said core.

In practicing the invention, the ends of the spider-arms are embedded in the annular, plastic body of rim-forming material 21ª, which is smaller in volume than the mold cavity 14, and said spider is then located in the chamber 15 in the lower member 12 of the mold, while the upper member or cover is removed, the pin 20 serving to centralize said spider, and the spider-arms being located near their outer ends in the lower halves of the channels 16. The upper member 13 of the mold will then be applied to the lower member in the manner represented in Fig. 1. The spider-arms are then in heat-conductive relation with the mold, and the rim-forming body 21ª is supported in an intermediate position in the mold cavity 14 at the ends of the spider-arms and sags against the bottom of said mold cavity between the ends of said arms, as indicated by the broken lines in Fig. 1, so that it can quickly and uniformly receive the heat of the mold, both directly therefrom, and indirectly through the metal of the spider-arms.

The mold is then fastened together by suitable bolts or clamps and placed in an open-steam heater, whereupon it becomes heated to expand the rim-forming body 21ª to the full size of the molding cavity 14 and vulcanize the rubber. The packing 17 serves to prevent access of the steam to the molding cavity. The central chamber 15 being at atmospheric pressure when the mold is closed, and the steam in the vulcanizer being at a higher pressure to give a vulcanizing temperature, the air which is displaced from the molding cavity as the stock expands is vented into the chamber 15 through the crevice between the mold members at their parting plane. In this way the wheel rim is vulcanized in a mold in open steam more quickly than it could be cured in a hot-plate press, and the presence of steam and water of condensation in the molding cavity before the stock has had time to swell and fill said cavity is avoided.

I do not limit myself to using all of the novel features of this invention in a single apparatus or method, and may considerably vary the details of embodiment within the scope of the claims.

The novel steering wheel herein represented is made the subject of a separate application, Serial No. 581,316, filed concurrently herewith.

I claim:

1. The herein-described method which comprises supporting a metal spider in heat-conductive relation with a metallic rim mold, with the ends of its arms projecting into the annular cavity of the mold, supporting an under-sized, annular, plastic, heat-expansible body of rim-forming material on the ends of said arms and supporting it on the bottom of the mold cavity between the ends of the arms, and expanding the rim material to fill the mold cavity by heat applied to the mold.

2. The herein-described method which comprises embedding the rim-supporting portions of a metal spider in an annular body of rim-forming rubber compound containing a gasifying substance, supporting said body in an annular cavity of a mold of larger volume than the body, with the spider in heat-conductive relation to the mold, and expanding and vulcanizing said rim-forming body by heat transmitted thereto through the mold and through the spider.

3. The method of forming a sponge rubber article which comprises incorporating a gasifying substance in a rubber compound, loosely enclosing a quantity of the compound with rigid mold members, so sealing said members to each other as to prevent passage of steam into the mold cavity when steam is applied exteriorly to the mold members at their parting plane, so applying steam to said mold members, and venting the mold cavity into a space not occupied by the steam, the rubber compound being so swelled by the heat of the steam as completely to fill the mold cavity defined by the rigid mold members.

4. The method of vulcanizing an annular sponge-rubber article which comprises enclosing the stock in an annular mold, exposing the mold to steam on its outer periphery, sealing the molding cavity and the inner space of the mold against access of the steam through that periphery, and venting the molding cavity through its inner periphery into said inner space.

5. The method of vulcanizing a sponge-rubber rim on a spider which comprises embedding the outer portion of the spider in an annular body of the rim-forming stock, enclosing said body in an annular mold, exposing the mold to steam on its outer periphery, sealing the molding cavity and the inner space of the mold against access of the steam through that periphery, and venting the molding cavity through its inner periphery into said inner space.

6. A vulcanizing mold comprising upper and lower members enclosing between them an inner chamber and an annular molding cavity surrounding said chamber and vented thereto through the crevice between said members, an annular packing gasket surrounding the molding cavity and occupying a groove formed in one of said members, and an annular rib on the other member adapted to enter said groove and compress the gasket, and the inner chamber to which the molding cavity is vented being out of communication with all steam receiving surfaces of the mold.

7. A vulcanizing mold for steering wheels, made in a plurality of parts and having a central venting and spider-containing chamber, a rim-molding cavity surrounding said chamber and radial channels connecting said cavity and chamber for receiving the spider arms, and means surrounding the molding cavity for sealing the mold parts against access of fluid to said cavity and the central chamber through the outer periphery of the mold.

8. A vulcanizing mold for steering wheels comprising upper and lower mold members enclosing between them a central chamber, an annular molding cavity surrounding the latter, and spoke channels connecting said chamber and cavity, a spider-centralizing pin on the lower member projecting upwardly from the bottom of said chamber, and an annular packing gasket on one of said members, coacting with the other member and surrounding said cavity.

In witness whereof I have hereunto set my hand this 8th day of August, 1922.

JOHN R. GAMMETER.